United States Patent
Düll et al.

(10) Patent No.: US 9,489,619 B2
(45) Date of Patent: Nov. 8, 2016

(54) METHOD FOR THE COMPUTER-ASSISTED MODELING OF A TECHNICAL SYSTEM

(75) Inventors: Siegmund Düll, München (DE);
Alexander Hans, Braunschweig (DE);
Steffen Udluft, Eichenau (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 312 days.

(21) Appl. No.: 13/992,799

(22) PCT Filed: Nov. 16, 2011

(86) PCT No.: PCT/EP2011/070243
§ 371 (c)(1),
(2), (4) Date: Jul. 10, 2013

(87) PCT Pub. No.: WO2012/076306
PCT Pub. Date: Jun. 14, 2012

(65) Prior Publication Data
US 2013/0282635 A1    Oct. 24, 2013

(30) Foreign Application Priority Data
Dec. 10, 2010 (DE) .................. 10 2010 062 832

(51) Int. Cl.
*G06F 15/18* (2006.01)
*G06N 3/08* (2006.01)
*G06N 3/04* (2006.01)

(52) U.S. Cl.
CPC .............. *G06N 3/08* (2013.01); *G06N 3/0445* (2013.01)

(58) Field of Classification Search
USPC ......................................................... 706/25
See application file for complete search history.

(56) References Cited

U.S. PATENT DOCUMENTS 5,250,014 A * 10/1993 Chang ................. A63B 21/075
                                                           482/106
5,857,321 A *  1/1999 Rajamani et al. ........... 60/39.27
(Continued)

FOREIGN PATENT DOCUMENTS

| DE | 102007001026 A1 | 7/2008 | ............ F02C 7/057 |
| DE | 102010011221 A1 | 9/2011 | ............ F02C 9/00 |
| WO |   2012/076306 A1 | 6/2012 | ............ G06N 3/04 |

OTHER PUBLICATIONS

Feasibility of Artificial Neural Network for Maximum Power Point Estimation of Non Crystalline-Si Photovoltaic Modules Syafaruddin; Takashi Hiyama; Engin Karatepe Intelligent System Applications to Power Systems, 2009. ISAP '09. 15th International Conference on Year: 2009 pp. 1-6, DOI: 10.1109/ISAP.2009.5352956 IEEE Conf. Pub.*

(Continued)

*Primary Examiner* — Michael B Holmes
(74) *Attorney, Agent, or Firm* — Slayden Grubert Beard PLLC

(57) ABSTRACT

A method for computer-assisted modeling of a technical system is disclosed. At multiple different operating points, the technical system is described by a first state vector with first state variable(s) and by a second state vector with second state variable(s). A neural network comprising a special form of a feed-forward network is used for the computer-assisted modeling of said system. The feed-forward network includes at least one bridging connector that connects a neural layer with an output layer, thereby bridging at least one hidden layer, which allows the training of networks with multiple hidden layers in a simple manner with known learning methods, e.g., the gradient descent method. The method may be used for modeling a gas turbine system, in which a neural network trained using the method may be used to estimate or predict nitrogen oxide or carbon monoxide emissions or parameters relating to combustion chamber vibrations.

14 Claims, 2 Drawing Sheets

(56) References Cited

U.S. PATENT DOCUMENTS

| | | | | |
|---|---|---|---|---|
| 8,099,181 | B2* | 1/2012 | Sterzing | G05B 17/02 700/47 |
| 8,160,978 | B2* | 4/2012 | Schafer | G05B 13/027 706/30 |
| 8,260,441 | B2* | 9/2012 | Scheegaβ | G05B 13/027 700/43 |
| 8,380,646 | B2* | 2/2013 | Hans | G05B 13/0265 706/12 |
| 8,447,706 | B2* | 5/2013 | Schneegaβ | F02C 9/00 706/12 |
| 8,494,980 | B2* | 7/2013 | Hans | G06N 99/005 700/21 |
| 8,554,707 | B2* | 10/2013 | Schafer | G05B 13/027 706/20 |
| 8,566,264 | B2* | 10/2013 | Schafer | G05B 13/027 706/15 |
| 9,043,254 | B2* | 5/2015 | Sterzing | G05B 13/048 703/2 |
| 9,141,915 | B2* | 9/2015 | Alonso | G06N 3/00 |
| 9,194,369 | B2* | 11/2015 | Dixon | F03D 7/022 |
| 2010/0049339 | A1 | 2/2010 | Schäfer et al. | 700/31 |
| 2013/0013543 | A1 | 1/2013 | Düll et al. | 706/25 |
| 2013/0282635 | A1 | 10/2013 | Düll et al. | 706/25 |

OTHER PUBLICATIONS

A multiple circular path convolution neural network system for detection of mammographic masses Shih-Chung B Lo; Huai Li; Yue Wang; L. Kinnard; M. T. Freedman IEEE Transactions on Medical Imaging Year: 2002, vol. 21, Issue: 2 pp. 150-158, DOI: 10.1109/42.993133 IEEE Journals & Magazines.*

Multi-objective optimization for VLSI implementation of Artificial Neural Network Jitesh R. Shinde; S. Salankar Advances in Computing, Communications and Informatics (ICACCI), 2015 International Conference on Year: 2015 pp. 1694-1700, DOI: 10.1109/ICACC1.2015.7275857 IEEE Conference Publications.*

A general framework for learning rules from data B. Apolloni; A. Esposito; D. Malchiodi; C. Orovas; G. Palmas; J. G. Taylor IEEE Transactions on Neural Networks Year: 2004, vol. 15, Issue: 6 pp. 1333-1349, DOI: 10.1109/TNN.2004.836249 IEEE Journals & Magazines.*

Peterson, Carsten et al., "JETNET 3.0—A Versatile Artificial Neural Network Package," Computer Physics Communications, vol. 81, No. 1-2, URL: http://cdsweb.cern.ch/record/259970/files/P00021783.pdf?version=1, 44 pages, Dec. 1993.

Dreyfus, Gérard, "Neural Networks: Methodology and Applications," Springer, URL: http://www.springerlink.com/content/978-3-540-22980-3/contents, 54 pages, 2005.

Schaefer, Anton Maximilian et al., "A Neural Reinforcement Learning Approach to Gas Turbine Control," Proceedings of International Joint Conference on Neural Networks, IEEE, 6 pages, Aug. 12, 2007.

Rosenberg, A., "Lecture 14—Neural Networks," Machine Learning, Queens College (CUNY), New York, URL: http://eniac.cs.qc.cuny.edu/andrew/gem1/lecture14.pdf, 50 pages, Mar. 18, 2010.

International Search Report and Written Opinion, Application No. PCT/EP2011/070243, 21 pages, Feb. 14, 2012.

Douglas, William et al., "Performance of Jump Connection Neural Networks Applied to a Simplified Pattern Recognition Problem," Journal of Computing Sciences in Colleges, vol. 15, No. 3, 7 pages, Jan. 1, 1999.

* cited by examiner

METHOD FOR THE COMPUTER-ASSISTED MODELING OF A TECHNICAL SYSTEM

CROSS-REFERENCE TO RELATED APPLICATIONS

This application is a U.S. National Stage Application of International Application No. PCT/EP2011/070243 filed Nov. 16, 2011, which designates the United States of America, and claims priority to DE Patent Application No. 10 2010 062 832.8 filed Dec. 10, 2010. The contents of which are hereby incorporated by reference in their entirety.

TECHNICAL FIELD

This disclosure relates to a method for the computer assisted modeling of a technical system and also to a method for the computer assisted estimation of states of a technical system, and to a corresponding computer program product.

BACKGROUND

The use of artificial neural networks which are trained on the basis of training data comprising appropriate states of the technical system for modeling a technical system is known from the prior art. The trained neural network is then suitable for estimating or predicting states of the technical system.

Neural networks enable the prediction of states of an output layer on the basis of states of an input layer, where one or more neural layers having hidden states are provided between output layer and input layer. The greater the number of hidden layers used, the more accurately a technical system can be modeled by means of training a neural network. In this situation the problem does however exist that conventional monitored training methods, in particular the gradient descent method, are unsuitable for neural networks having a plurality of hidden layers. As a result, neural networks having a plurality of hidden layers are often trained in layer fashion using unmonitored training methods, where the adjustment to the actual states in accordance with the training data takes place subsequently using a gradient descent method.

The publication PETERSON, C. et al.: JETNET 3.0—A versatile artificial neural network package, Computer *Physics Communications*, Vol. 81, 1993, No. 1-2, pp. 185-220, relates to the description of a program package which is based on neural networks. In this situation the use of so-called skip-layer networks comprising skip-layer connections is also described.

The publication ROSENBERG, A.: Lecture 14—Neural Networks, Machine Learning, Queens College (CUNY), New York, USA, March 2010, discloses the structure of a skip-layer network in which an input layer is connected directly to an output layer by way of connectors.

The publication REYFUS G., Neural Networks, Methodoloy and Applications, 2nd edition, Berlin, Springer, 2005. pp. i, iii-xvi, 1-11, 171-186, discloses inter alia how a recurrent neural network can be represented in the canonical form of a feed-forward network. Several outputs from this feed-forward network are fed back to the inputs of the network.

SUMMARY

One embodiment provides a method for the computer-assisted modeling of a technical system, in which: the operation of the technical system is described in each case for a plurality of operating points by a first state vector with one or more first state variables and by a second state vector with one or more second state variables; the technical system is modeled by training a neural network comprising at least one feed-forward network based on training data from known first and second state vectors for a plurality of operating points; wherein the at least one feed-forward network contains a plurality of neural layers comprising one input layer, at least one hidden layer and one output layer, wherein the neural layers are interconnected by way of connectors with respective weights and the input layer is linked with at least one first state vector and the output layer with at least one second state vector; wherein at least one connector of the at least one feed-forward network is a bridging connector which connects a neural layer with the output layer whilst bridging at least one hidden layer; and wherein the at least one feed-forward network comprises a plurality of hidden layers and each hidden layer not connected directly with the output layer is connected with the output layer by way of a bridging connector.

In a further embodiment, the input layer of the at least one feed-forward network is connected with the output layer by way of a bridging connector.

In a further embodiment, the neural network is trained by way of a gradient descent method and in particular by way of error back-propagation.

In a further embodiment, the neural network furthermore contains a recurrent neural network, coupled with the at least one feed-forward network, comprising an input layer and a recurrent hidden layer, wherein the input layer of the recurrent neural network contains first state vectors at chronologically sequential operating points of the technical system comprising one current and one or more past operating points, wherein each first state vector at the respective operating point of the input layer of the recurrent neural network is connected by way of a connector with corresponding weight with a hidden state vector at the respective same operating point of the recurrent hidden layer of the recurrent neural network, wherein the hidden state vector at the current operating point represents the input layer of the at least one feed-forward network and the output layer of said feed-forward network represents the second state vector at the current operating point.

In a further embodiment, the input layer of the recurrent neural network furthermore comprises one or more first state vectors at chronologically sequential future operating points of the technical system and each first state vector at a future operating point is connected by way of a connector with corresponding weight with a hidden state vector at the future operating point of the recurrent hidden layer of the recurrent neural network, wherein each hidden state vector at a future operating point forms the input layer of the at least one feed-forward network for the future operating point, wherein the output layer of each feed-forward network for a future operating point represents the second state vector at the future operating point.

In a further embodiment, the connectors of all feedforward networks which connect neural layers corresponding to one another have the same weights.

In a further embodiment, the connectors between the input layer of the recurrent neural network and the recurrent hidden layer of the recurrent neural network at past operating points have the same first weights.

In a further embodiment, the connectors between the input layer of the recurrent neural network and the recurrent hidden layer of the recurrent neural network at the current and at future operating points have the same second weights.

In a further embodiment, the connectors of the hidden recurrent layer of the recurrent neural network, which extend out of hidden state vectors at past operating points, have the same third weights.

In a further embodiment, the connectors of the hidden recurrent layer of the recurrent neural network, which extend into hidden state vectors at future operating points, have the same fourth weights.

In a further embodiment, a turbine, e.g., a gas turbine, is modeled as a technical system.

In a further embodiment, the first state vectors of the gas turbine comprise one or more of the following state variables of the gas turbine: one or more temperature values at or in the gas turbine, in particular one or more fuel gas temperature values, one or more gas pressure values at or in the gas turbine, in particular one or more fuel gas pressure values, one or more control values for setting one or more of the partial fuel flows fed to the gas turbine.

In a further embodiment, the second state vectors comprise one or more of the following state variables: one or more emission values for nitrogen oxides and/or for carbon monoxide; one or more parameters which describe vibrations of the combustion chamber of the gas turbine.

Another embodiment provides a method for the computer-assisted estimation of states of a technical system, wherein the technical system is modeled by the training of a neural network according to any of the methods disclosed above, wherein one or more second state vectors of the technical system are determined by way of the trained neural network on the basis of one or more first state vectors of the technical system.

Another embodiment provides a computer program product having program code stored on a non-transitory computer-readable medium and executable by a processor for performing any of the methods disclosed above.

BRIEF DESCRIPTION OF THE DRAWINGS

Exemplary embodiments of the invention are described in detail in the following with reference to the attached figures, in which.

DETAILED DESCRIPTION

Figure 1:
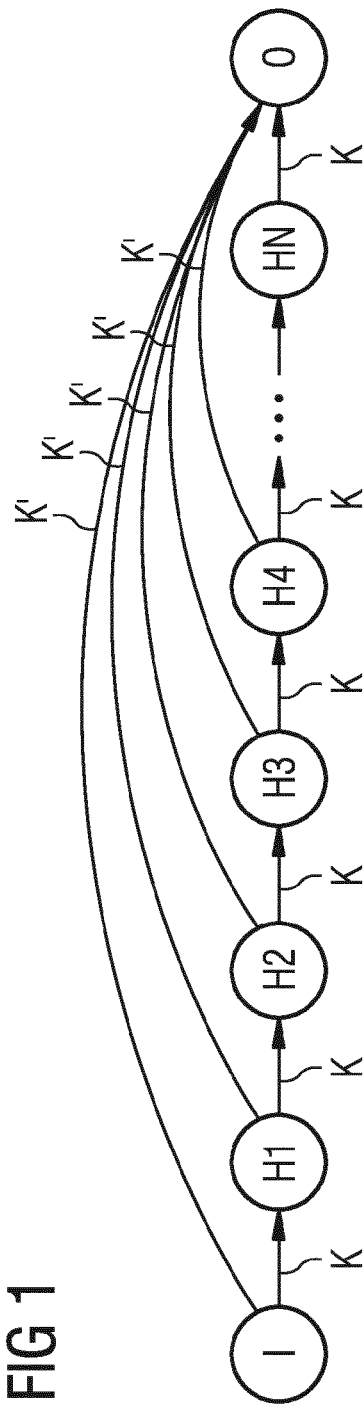
FIG. 1 shows a schematic illustration of the general topology used in the method of a feed-forward network, according to one embodiment of the invention.

Embodiments of the present invention may provide simple and accurate modeling of a technical system based on a computer-assisted method using a neural network.

In some embodiments the method may be used for the computer-assisted modeling of a technical system, the operation of which is described in each case for a plurality of operating points by a first state vector with one or more first state variables and by a second state vector with one or more second state variables. The technical system is modeled by training a neural network comprising at least one feed-forward network based on training data from known first and second state vectors for a plurality of operating points. Feed-forward networks forward neural outputs only in one processing direction. The at least one feed-forward network used in the disclosed method contains a plurality of neural layers which comprise one input layer, one or more hidden layers and one output layer. These layers contain state vectors in the form of corresponding neural clusters comprising one or more neurons. The neural layers are interconnected by way of so-called connectors with respective weights in the form of weight matrices. Furthermore, the input layer is linked with at least one first state vector and the output layer with at least one second state vector. The concept of linkage of the input layer with the at least one first state vector or of the output layer with the at least one second state vector is to be understood in a broad sense. In particular, the at least one first state vector can be part of the input layer or represent said input layer. The same applies to the at least one second state vector which can be part of the output layer or represent said output layer. It is also possible for the at least one first state vector to be subjected to a preprocessing step, in which case the preprocessed vector resulting therefrom is then part of the input layer. As described in detail further below, for example the first state vector can be converted by way of a recurrent neural network into a hidden state vector which then represents the input layer of the feed-forward network. By analogy, it is also possible that the output layer does not yet represent the at least one second state vector but that the latter is generated in a separate postprocessing step.

The method may be characterized by a special structure of the feed-forward network used. According to this structure, at least one connector is a bridging connector which connects a neural layer with the output layer whilst bridging at least one hidden layer. As a result of these additional bridging connectors, simple and efficient training of the at least one feed-forward network is also achieved for a large number of hidden layers, with a good quality of modeling being ensured at the same time. In a preferred embodiment the at least one feed-forward network comprises five or more and preferably eight or more and particularly preferably 40 or more layers. In this situation the network structure can be trained in a simple manner using already known training methods, such as for example the gradient descent method and in particular the error back-propagation method. In this situation, due to the bridging connector(s) the back-propagated error signal does not need to pass through all the layers above a particular layer until the weights of the particular layer are influenced.

The at least one feed-forward network may comprise a plurality of hidden layers, wherein each hidden layer not connected directly with the output layer is connected with the output layer by way of a bridging connector. In this way it is ensured that a direct connection to the output layer is guaranteed for all hidden layers. In a further embodiment the input layer of the at least one feed-forward network is also connected with the output layer by way of a bridging connector.

In one embodiment of the method it is possible with the neural network to model the dynamic behavior of the technical system for a plurality of chronologically sequential operating points of the system. This is achieved due to the fact that in addition to the at least one feed-forward network a recurrent neural network is used which is coupled with the at least one feed-forward network. In this situation the recurrent neural network comprises an input layer and a recurrent hidden layer, wherein in contrast to a feed-forward network the hidden state vectors are also connected by way of connectors within the layer. The input layer of the recurrent neural network contains first state vectors at chronologically sequential operating points of the technical system comprising one current and one or more past operating points, where each first state vector at the respective operating point of the input layer of the recurrent neural network is connected by way of a connector with corresponding weight with a hidden state vector at the respective same operating point of the recurrent hidden layer of the recurrent neural network. Furthermore, the hidden state vector at the current operating point represents the input layer of the at least one feed-forward network, whereas the output layer of this feed-forward network represents the second state vector at the current operating point.

In a particularly preferred embodiment of the neural network just described, which uses a recurrent neural network in addition to the feed-forward network, it is also possible in a suitable manner to model state vectors for one or more future operating points of the technical system in order to subsequently predict these in a suitable manner with the trained neural network. In order to achieve this, the input layer of the recurrent neural network furthermore comprises one or more first state vectors at chronologically sequential future operating points of the technical system and each first state vector at a future operating point is connected by way of a connector with corresponding weight with a hidden state vector at the future operating point of the recurrent hidden layer of the recurrent neural network. In this situation each hidden state vector at a future operating point forms the input layer of the at least one feed-forward network for the future operating point, where the output layer of each feed-forward network for a future operating point represents the second state vector at the future operating point.

The embodiment just described thus comprises a plurality of feed-forward networks at the current operating point and at one or more future operating points. Training of this neural network which is particularly efficient in terms of computation is achieved in a preferred embodiment by the fact that the connectors of all feed-forward networks which connect neural layers corresponding to one another have the same weights. The connectors between the input layer of the recurrent neural network and the recurrent hidden layer of the recurrent neural network at past operating points preferably also have the same first weights. Similarly, the connectors between the input layer of the recurrent neural network and the recurrent hidden layer of the recurrent neural network at the current and at future operating points preferably have the same second weights.

In a further preferred embodiment the connectors of the hidden recurrent layer of the recurrent neural network, which extend out of hidden state vectors at past operating points, have the same third weights. Similarly, the connectors of the hidden recurrent layer of the recurrent neural network, which extend into hidden state vectors at future operating points, preferably have the same fourth weights.

The method can be used for modeling any desired technical systems. A particularly preferred application situation here is the modeling of a technical system in the form of a turbine, in particular a gas turbine, where the gas turbine preferably constitutes a generator for producing electrical energy from fossil fuels.

If a gas turbine is modeled as a technical system, then the first state vectors comprise corresponding environmental parameters or modifiable manipulated variables for the gas turbine. The first state vectors of the gas turbine preferably contain one or more of the following state variables: one or more temperature values at or in the gas turbine, in particular one or more fuel gas temperature values, one or more gas pressure values at or in the gas turbine, in particular one or more fuel gas pressure values, one or more control values for setting one or more of the partial fuel flows fed to the gas turbine. In this situation the individual values can be measured or set at different points in the gas turbine.

If a gas turbine is modeled as a technical system, then the second state vectors preferably comprise one or more of the following state variables: one or more emission values for nitrogen oxides and/or for carbon monoxide; one or more parameters which describe vibrations of the combustion chamber of the gas turbine.

The neural network trained using the method described above can subsequently be used for estimating or predicting second state vectors. Some embodiments provide a method for the computer-assisted estimation of states of a technical system, wherein the technical system is modeled by the training of a neural network on the basis of the disclosed method and one or more second state vectors of the technical system are determined by way of the trained neural network on the basis of one or more first state vectors of the technical system.

Other embodiments provide a computer program product having program code stored on a non-transitory machine readable medium for carrying out the disclosed method when the program runs on a computer.

In some embodiments the method may be used for the modeling of a technical system which is described by way of first and second state vectors at corresponding operating points of the technical system. In this situation, a neural network is trained on the basis of training data in the form of known first and second state vectors, in which case the trained neural network can subsequently be used for the prediction of second state vectors based on arbitrary first state vectors not contained in the training data. In this manner, for example during real operation of the technical system certain states can be predicted before they occur or certain states usually measured by means of complex measuring methods can be estimated without the need to measure said states separately. In particular, the trained neural network enables second state variables to be estimated or predicted which are critical for the operation of the technical system and for example may result in damage to the technical system. It is thus possible to initiate appropriate countermeasures in advance, for example stopping the technical system. In this situation the neural network trained using the disclosed method delivers very good modeling of the real behavior of the technical system. This has been proved through simulations carried out by the inventors, as will be described further below.

The method may be characterized by a novel, special structure of a neural network to be trained in the form of a cascaded network. Such a network structure is reproduced in general fashion in FIG. 1. In this situation the neural network constitutes a so-called feed-forward network which has the property that neural outputs are routed only in the processing direction from an input layer by way of hidden layers to an output layer. In the network shown in FIG. 1 the input layer is identified by reference character I and the output layer by reference character O. The layers situated in between constitute hidden layers and are identified by H1, H2, . . . , HN. According to FIG. 1, each layer comprises an individual cluster comprising a plurality of neurons, where the neurons of the input layer I constitute a first state vector of a technical system and the neurons of the output layer O constitute a second state vector of the technical system. By contrast, the neurons in the hidden layers represent hidden states of the technical system.

As can be seen from FIG. 1, the individual adjacent layers of the network are connected to one another in the forward direction of the network by way of connectors K. Said connectors couple the individual layers of the neural network with corresponding weights in the form of weight matrices. The individual neuron clusters of the hidden layers use a non-linear activation function, in which case a sigmoid function such as for example the hyperbolic tangent is normally used as the activation function.

In contrast to a conventional feed-forward network the network according to FIG. 1 is characterized by the fact that further connectors K' with corresponding weights are provided, wherein in each case the individual connectors connect a neural layer comprising the input layer I and also the first to penultimate hidden layers (in other words the layers H1 to HN-1) with the output layer O. The individual connectors K' thus constitute bridging connectors within the meaning of the claims because they always connect two neural layers whilst bridging at least one hidden layer. This cascaded structure has the advantage that it can also be trained in the case of large number of hidden layers by using a simple monitored training method, in particular using a gradient descent method, such as for example error backpropagation, and in this situation simultaneously models the behavior of the underlying technical system very well. In contrast to this, in the case of conventional feed-forward networks having a plurality of hidden layers, in order to achieve good modeling of the technical system it is necessary to employ complex training methods in which each layer is initially trained using unmonitored training and the parameters are subsequently adapted to the training data by way of a gradient descent method.

In one embodiment, a plurality of network structures according to FIG. 1 are linked with a recurrent neural network structure, wherein connectors may also occur within a layer. The opportunity is thereby created in particular of using training patterns in the form of first and second state vectors at a plurality of chronologically sequential operating points of the technical system and thus also enabling a prediction of a plurality of future second state vectors. By this means it is possible to predict the dynamic behavior of the technical system in the future with a high degree of accuracy.

Figure 2:
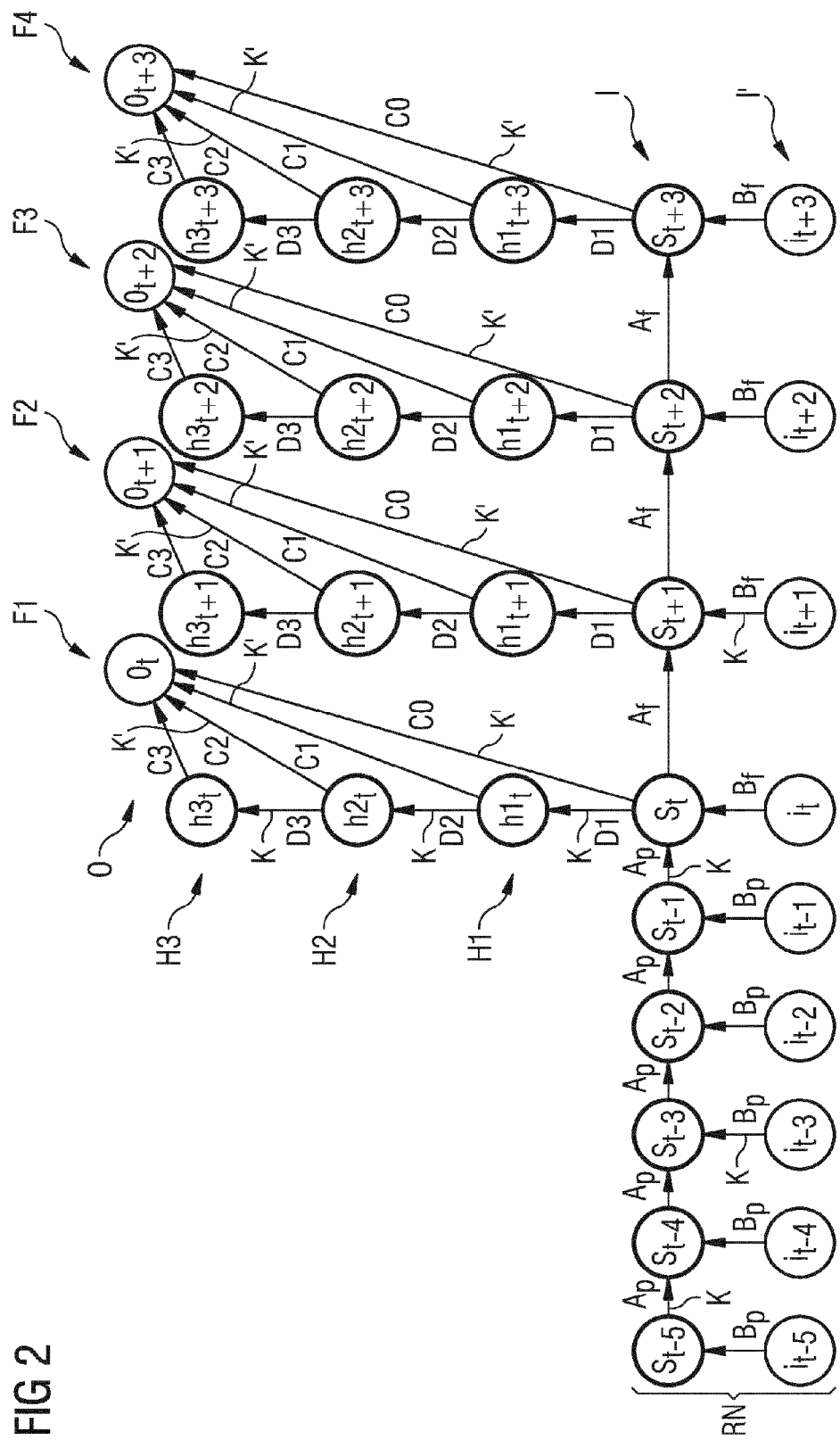
FIG. 2 shows an example embodiment of a neural network used in a variant of the disclosed method.

FIG. 2 shows a combination of a plurality of feedforward networks according to FIG. 1 having a recurrent neural network structure. In this situation the structure of the network according to FIG. 2 follows the principle of the structure of the neural networks which are described in the German patent applications having the numbers 10 2007 001 026 and 10 2010 011 221. The entire disclosure content of these patent applications is made the content of the present application by reference. The recurrent network structure is identified in FIG. 2 by RN and comprises the input layer I' and also the hidden layer I. This network structure is coupled with four feed-forward networks F1, F2, F3 and F4, wherein each network corresponds in its structure to the network according to FIG. 1 and has corresponding bridging connectors K'. According to FIG. 2, all the other connectors which do not constitute bridging connectors are identified by reference character K, where for reasons of clarity the reference character K is however used only in part for the connectors. The connectors K and K' in turn connect individual neuron clusters by way of weights in the form of weight matrices, with the corresponding weight matrices now being specified for all connectors.

In the embodiment according to FIG. 2 a time series of first state vectors of the technical system is considered which extend across past operating points t−5, t−4 etc. to the current operating point t and from there to three future operating points t+1, t+2 and t+3. In this situation, a corresponding first state vector $i_{t-5}$, $i_{t-4}$, . . . , $i_{t+3}$ exists at each of these operating points. This time series of first state vectors is taken into consideration during training of the neural network, in other words respective time segments comprising these state vectors are used as training data for training the network, where the training data furthermore comprises the corresponding second state vectors $o_t$, $o_{t+1}$, $o_{t+2}$ and $o_{t+3}$ which in FIG. 2 in each case form an output layer of the feed-forward networks F1, F2, F3 and F4.

The individual first state vectors of the input layer I' of the recurrent neural network RN are coupled with corresponding hidden states $s_{t-5}$, $s_{t-4}$, . . . , $s_{t+3}$ in the form of hidden state vectors of the hidden recurrent layer I. In this situation, for the connectors the same weights $B_p$ are used for past first state vectors and the same weights $B_f$ for the current and future first state vectors. The hidden state vectors are furthermore connected to one another by way of connectors, where the connectors between past state vectors $s_{t-5}$, $s_{t-4}$ etc. or the last past state vector $s_{t-1}$ and the current state vector $s_t$ have the same weights $A_p$. The connectors which extend into future hidden states $s_{t+1}$, $s_{t+2}$ etc. likewise have the same weights $A_f$.

In the embodiment according to FIG. 2 structures having three hidden layers are used as cascaded feed-forward networks F1 to F4, in which case each feed-forward network contains a neuron cluster in a respective hidden layer. The neuron clusters of the hidden layers of the feed-forward network F1 are identified in this situation by $h1_t$, $h2_t$, and $h3_t$, the neuron clusters of the hidden layers of the feed-forward network F2 by $h1_{t+1}$, $h2_{t+1}$ and $h3_{t+1}$. By analogy, corresponding designations have been used for the further neuron clusters of the hidden layers of the feed-forward networks F3 and F4. As can be seen from FIG. 2, the states of the input layer of the individual feed-forward networks F1 to F4 are now hidden state vectors of the hidden layer I of the recurrent neural network RN. In other words, the input layer is formed by the state vector $s_t$, for the network F1, by the state vector $s_{t+1}$ for the network F2 etc.

For the feed-forward networks F1 to F4, the corresponding weight matrices are again specified for the individual connectors. It can be seen that the connectors corresponding to one another of the respective feed-forward networks use the same weight matrices. In particular, the weight matrix D1 is used for the connectors between the input layer I and the first hidden layer H1, the weight matrix D2 for the connectors between the first hidden layer H1 and the second hidden layer H2, the weight matrix D3 for the connectors between the second hidden layer H2 and the third hidden layer H3, and the weight matrix C3 for the connectors between the third hidden layer H3 and the output layer O. The same weights are likewise employed for bridging connectors corresponding to one another in the individual feed-forward networks. In other words, the weight matrix CO is used for the connectors between the input layer I and the output layer O, the weight matrix C1 for the connectors between the first hidden layer H1 and the output layer O, and the weight matrix C2 for the connectors between the second hidden layer H2 and the output layer O.

The network structure according to FIG. 2 has been tested by the inventors on the basis of training data relating to the operation of a gas turbine. In contrast to the illustration in FIG. 2, feed-forward networks having nine instead of three hidden layers were used in the process. For training purposes, in total approximately 400,000 training patterns in the form of corresponding time series of the first state vectors $i_{t-5}$, . . . , $i_{t+3}$ and of the second state vectors $o_t$, . . . , $o_{t+3}$ were employed. In order to check whether the trained neural network reflects the actual operation of the technical system, second states estimated using the trained neural network were compared with known second states of the technical system, with approximately 100,000 patterns being used for the comparison.

Different environmental parameters and manipulated variables for the gas turbine, such as for example different temperatures and gas pressures and also settings for partial fuel flows fed to the gas turbine were taken into consideration as state variables of the first state vectors. In one simulation emissions of nitrogen oxides and carbon monoxide and in another simulation the amplitudes of combustion chamber vibrations at different acoustic frequencies were taken into consideration as state variables of the second state vectors. The results achieved with the trained network were compared in this situation with results from a three-layer and four-layer network, with these networks being constructed in similar fashion to FIG. 2 but not comprising any connectors K'. For the three-layer network, only the hidden layer I exists in this situation without the further hidden layers H1 to H3. By contrast, for the four-layer network the hidden layer H1 also exists in addition to the layer I. The disclosed training process was repeated several times for the network and the comparison networks in order to achieve significant results.

In comparison with the three-layer network, a 14% greater average accuracy was achieved with the cascaded network as disclosed herein and a 12% greater accuracy for the most successful training process. Furthermore, a 13% greater accuracy was achieved for the least successful training process. These results show clearly that the cascaded network as disclosed herein enables a significantly better modeling of the behavior of a gas turbine in comparison with a three-layer network.

Compared with the four-layer network, an 8% greater average accuracy was achieved for the cascaded network as disclosed herein, a 5% greater accuracy for the most successful training process and an 18% greater accuracy for the least successful training process. The four-layer network is thus better suited for modeling a gas turbine than the three-layer network. Nevertheless the cascaded network as disclosed herein is still significantly better than the four-layer network. Furthermore, the network as disclosed herein is also more robust because the spread of the accuracies of the different training processes was less for the cascaded network than for the four-layer network.

As is apparent from the above, the disclosed method, which is based on the training of a cascaded neural network structure, is very well suited for the modeling of technical systems, wherein the training can be effected in a simple manner by means of a conventional gradient descent method. A correspondingly trained neural network comprising said cascaded network structure can then be employed very well within the framework of real operation or simulation of a technical system in order to predict operating states of the technical system.

What is claimed is:

1. A method for the computer-assisted modeling of a technical system, comprising:
    for a plurality of operating points, describing the operation of the technical system by a first state vector with one or more first state variables and by a second state vector with one or more second state variables;
    modeling the technical system training a neural network comprising at least one feed-forward network based on training data from known first and second state vectors for a plurality of operating points;
    wherein the at least one feed-forward network contains a plurality of neural layers comprising an input layer, at least one hidden layer and an output layer, wherein the neural layers are interconnected by connectors with respective weights and the input layer is linked with at least one first state vector and the output layer with at least one second state vector;
    wherein at least one connector of the at least one feed-forward network is a bridging connector which connects a neural layer with the output layer while bridging at least one hidden layer; and
    wherein the at least one feed-forward network comprises a plurality of hidden layers and each hidden layer not connected directly with the output layer is connected with the output layer by a bridging connector,
    wherein the neural network furthermore contains a recurrent neural network, coupled with the at least one feed-forward network, comprising an input layer and a recurrent hidden layer, wherein the input layer of the recurrent neural network comprises first state vectors at chronologically sequential operating points of the technical system comprising one current and one or more past operating points,
    wherein each first state vector at the respective operating point of the input layer of the recurrent neural network is connected by way of a connector with corresponding weight with a hidden state vector at the respective same operating point of the recurrent hidden layer of the recurrent neural network, and
    wherein the hidden state vector at the current operating point represents the input layer of the at least one feed-forward network and the output layer of said feed-forward network represents the second state vector at the current operating point.

2. The method as claimed in claim 1, wherein the input layer of the at least one feed-forward network is connected with the output layer by a bridging connector.

3. The method as claimed in claim 1, wherein the neural network is trained by a gradient descent method using error back-propagation.

4. The method of claim 1, wherein the input layer of the recurrent neural network furthermore comprises one or more first state vectors at chronologically sequential future operating points of the technical system and each first state vector at a future operating point is connected by way of a connector with corresponding weight with a hidden state vector at the future operating point of the recurrent hidden layer of the recurrent neural network,
    wherein each hidden state vector at a future operating point forms the input layer of the at least one feed-forward network for the future operating point, and
    wherein the output layer of each feed-forward network for a future operating point represents the second state vector at the future operating point.

5. The method of claim 4, wherein the connectors of all feed-forward networks which connect neural layers corresponding to one another have the same weights.

6. The method of claim 1, wherein the connectors between the input layer of the recurrent neural network and the recurrent hidden layer of the recurrent neural network at past operating points have the same weights.

7. The method of claim 4, wherein the connectors between the input layer of the recurrent neural network and the recurrent hidden layer of the recurrent neural network at the current and at future operating points have the same weights.

8. The method of claim 1, wherein the connectors of the hidden recurrent layer of the recurrent neural network, which extend out of hidden state vectors at past operating points, have the same weights.

9. The method of claim 4, wherein the connectors of the hidden recurrent layer of the recurrent neural network, which extend into hidden state vectors at future operating points, have the same weights.

10. The method of claim 1, wherein a gas turbine is modeled as a technical system.

11. The method of claim 10, wherein the first state vectors of the gas turbine comprise one or more of the following state variables of the gas turbine:
- one or more temperature values at or in the gas turbine, in particular one or more fuel gas temperature values, one or more fuel gas pressure values at or in the gas turbine, and
- one or more control values for setting one or more of the partial fuel flows fed to the gas turbine.

12. The method of claim 10, wherein the second state vectors comprise one or more of the following state variables: one or more emission values for nitrogen oxides, one or more emission values for carbon monoxide; and one or more parameters which describe vibrations of the combustion chamber of the gas turbine.

13. A method for computer-assisted estimation of states of a technical system, wherein the technical system is modeled by:
- for a plurality of operating points, describing the operation of the technical system by a first state vector with one or more first state variables and by a second state vector with one or more second state variables;
- modeling the technical system by training a neural network comprising at least one feed-forward network based on training data from known first and second state vectors for a plurality of operating points;
- wherein the at least one feed-forward network contains a plurality of neural layers comprising an input layer, at least one hidden layer and an output layer, wherein the neural layers are interconnected by connectors with respective weights and the input layer is linked with at least one first state vector and the output layer with at least one second state vector;
- wherein at least one connector of the at least one feed-forward network is a bridging connector which connects a neural layer with the output layer while bridging at least one hidden layer;
- wherein the at least one feed-forward network comprises a plurality of hidden layers and each hidden layer not connected directly with the output layer is connected with the output layer by a bridging connector; and
- determining one or more second state vectors of the technical system using the trained neural network based on one or more first state vectors of the technical system.

14. A computer program product having program code stored on a non-transitory computer-readable medium and executable by a processor for modeling a technical system by:
- for a plurality of operating points, describing the operation of the technical system by a first state vector with one or more first state variables and by a second state vector with one or more second state variables;
- modeling the technical system by training a neural network comprising at least one feed-forward network based on training data from known first and second state vectors for a plurality of operating points;
- wherein the at least one feed-forward network contains a plurality of neural layers comprising an input layer, at least one hidden layer and an output layer, wherein the neural layers are interconnected by connectors with respective weights and the input layer is linked with at least one first state vector and the output layer with at least one second state vector;
- wherein at least one connector of the at least one feed-forward network is a bridging connector which connects a neural layer with the output layer while bridging at least one hidden layer; and
- wherein the at least one feed-forward network comprises a plurality of hidden layers and each hidden layer not connected directly with the output layer is connected with the output layer by a bridging connector.

* * * * *